(12) United States Patent
Takada et al.

(10) Patent No.: US 8,657,270 B2
(45) Date of Patent: Feb. 25, 2014

(54) COVER MEMBER AND SUSPENSION

(75) Inventors: Akira Takada, Saitama (JP); Shinichi Sutou, Tokyo (JP)

(73) Assignee: Showa Corporation, Saitama (JP)

( * ) Notice: Subject to any disclaimer, the term of this patent is extended or adjusted under 35 U.S.C. 154(b) by 132 days.

(21) Appl. No.: 13/324,697

(22) Filed: Dec. 13, 2011

(65) Prior Publication Data

US 2012/0319338 A1 Dec. 20, 2012

(30) Foreign Application Priority Data

Jun. 14, 2011 (JP) .................................. 2011-132590

(51) Int. Cl.
*F16F 9/38* (2006.01)

(52) U.S. Cl.
USPC ................. 267/221; 188/322.12; 280/124.162

(58) Field of Classification Search
USPC .............. 188/322.12; 267/217, 221; 138/121, 138/122, 173, DIG. 11; 277/636; 280/124.157, 124.158, 124.162
See application file for complete search history.

(56) References Cited

U.S. PATENT DOCUMENTS

| 2,876,801 | A | * | 3/1959 | November | 138/121 |
| 4,079,757 | A | * | 3/1978 | Fischer et al. | 138/121 |
| 5,133,573 | A | * | 7/1992 | Kijima et al. | 280/124.155 |
| 5,176,390 | A | * | 1/1993 | Lallement | 277/636 |
| 5,599,029 | A | * | 2/1997 | Umeno | 277/636 |

FOREIGN PATENT DOCUMENTS

JP 10267124 10/1998

* cited by examiner

*Primary Examiner* — Thomas J Williams
(74) *Attorney, Agent, or Firm* — Leason Ellis LLP (57) ABSTRACT

A cover member having plural peak portions and plural trough portions, and freely stretched and shrunk in an array direction of the plural peak portions and the plural trough portions or freely bent, the cover member includes: a hollow part formed in each of the plural peak portions, the hollow part being hollowed toward an inner side from a peak of each of the plural peak portions, being formed in a circumferential direction, and having edge parts, a bottom part and side parts located between the edge parts and the bottom part. The edge parts of the hollow part are brought into contact with each other before the side parts of the hollow part are brought into contact with each other, when at least one of the plural peak portions is subjected to force in a direction intersecting with the array direction from an outside.

6 Claims, 8 Drawing Sheets

COVER MEMBER AND SUSPENSION

CROSS REFERENCE TO RELATED APPLICATIONS

This application is based on and claims priority under 35 USC §119 from Japanese Patent Application No. 2011-132590 filed Jun. 14, 2011.

BACKGROUND

1. Technical Field

The present invention relates to a cover member and a suspension.

2. Related Art

Until now, a cover member has been used for covering and protecting outer circumferences of a piston rod and a cylinder in a hydraulic shock absorber included in a suspension, for example.

A bellows body (cover member) disclosed in Japanese Patent Application Laid Open Publication No. 10-267124 has a cross section in which continuous peaks and troughs are formed except for attachment parts at both ends.

SUMMARY

If rigidity of peak portions of a bellows cover member is small, there is a possibility that an operator may dent the peak portions by mistake when a suspension on which the cover member is mounted is incorporated into a vehicle. In addition, the peak portions may be accidentally dented by hitting the cover member with a stone or the like on a road while the vehicle having the suspension on which the cover member is mounted is moving. In this case, if the peak portions are difficult to return to the original shape when they are dented, the vehicle continues to move while the cover member is stretched and shrunk in the dented state. As a result, unexpected stress may be generated or the cover member may be scratched with a member such as a cylinder located inside the cover member, and thus the cover member may tear.

Therefore, it is desirable that the cover member has the peak portions difficult to be dent even if force acts thereon from the outside. Alternatively, it is desirable that the peak portions easily return to the original shape by itself even when they are deformed.

For this purpose, according to the present invention, there is provided a cover member having plural peak portions and plural trough portions, and freely stretched and shrunk in an array direction of the plural peak portions and the plural trough portions or freely bent, the cover member including: a hollow part formed in each of the plural peak portions, the hollow part being hollowed toward an inner side from a peak of each of the plural peak portions, being formed in a circumferential direction, and having edge parts, a bottom part and side parts located between the edge parts and the bottom part. The edge parts of the hollow part are brought into contact with each other before the side parts of the hollow part are brought into contact with each other, when at least one of the plural peak portions is subjected to force in a direction intersecting with the array direction from an outside.

Here, the edge parts of the hollow part may be connected to the plural trough portions.

From another standpoint, according to the present invention, there is provided a cover member having plural peak portions and plural trough portions, and freely stretched and shrunk in an array direction of the plural peak portions and the plural trough portions or freely bent, the cover member including: a hollow part formed in each of the plural peak portions, the hollow part being hollowed toward an inner side from a peak of each of the plural peak portions, being formed in a circumferential direction, and having edge parts, a bottom part and side parts located between the edge parts and the bottom part. Distance between the edge parts of the hollow part in the array direction is not larger than distance between the side parts of the hollow part.

Here, the edge parts of the hollow part may be connected to the plural trough portions.

From further standpoint, according to the present invention, there is provided a suspension including: a cylinder into which a damping device is incorporated; a piston rod that supports a piston contained in the cylinder; a spring that is arranged on an outer side of the piston rod; and a cover member that is arranged between the cylinder and the spring and between the piston rod and the spring, and covers outer circumferences of the cylinder and the piston rod. The cover member has plural peak portions and plural trough portions, and is freely stretched and shrunk in an array direction of the plural peak portions and the plural trough portions or freely bent. The cover member includes: a hollow part formed in each of the plural peak portions, the hollow part being hollowed toward an inner side from a peak of each of the plural peak portions, being formed in a circumferential direction, and having edge parts, a bottom part and side parts located between the edge parts and the bottom part. The edge parts of the hollow part are brought into contact with each other before the side parts of the hollow part are brought into contact with each other, when at least one of the plural peak portions is subjected to force in a direction intersecting with the array direction from an outside.

From furthermore standpoint, according to the present invention, there is provided a suspension including: a cylinder into which a damping device is incorporated; a piston rod that supports a piston contained in the cylinder; a spring that is arranged on an outer side of the piston rod; and a cover member that is arranged between the cylinder and the spring and between the piston rod and the spring, and covers outer circumferences of the cylinder and the piston rod. The cover member has plural peak portions and plural trough portions, and is freely stretched and shrunk in an array direction of the plural peak portions and the plural trough portions or freely bent. The cover member includes: a hollow part formed in each of the plural peak portions, the hollow part being hollowed toward an inner side from a peak of each of the plural peak portions, being formed in a circumferential direction, and having edge parts, a bottom part and side parts located between the edge parts and the bottom part. Distance between the edge parts of the hollow part in the array direction is not larger than distance between the side parts of the hollow part.

According to the aforementioned aspects of the present invention, it is possible to make the peak portions difficult to be dent and to make the peak portions return to the original shape by itself easily when force acts thereon from the outside.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the attached drawings.

Figure 1:
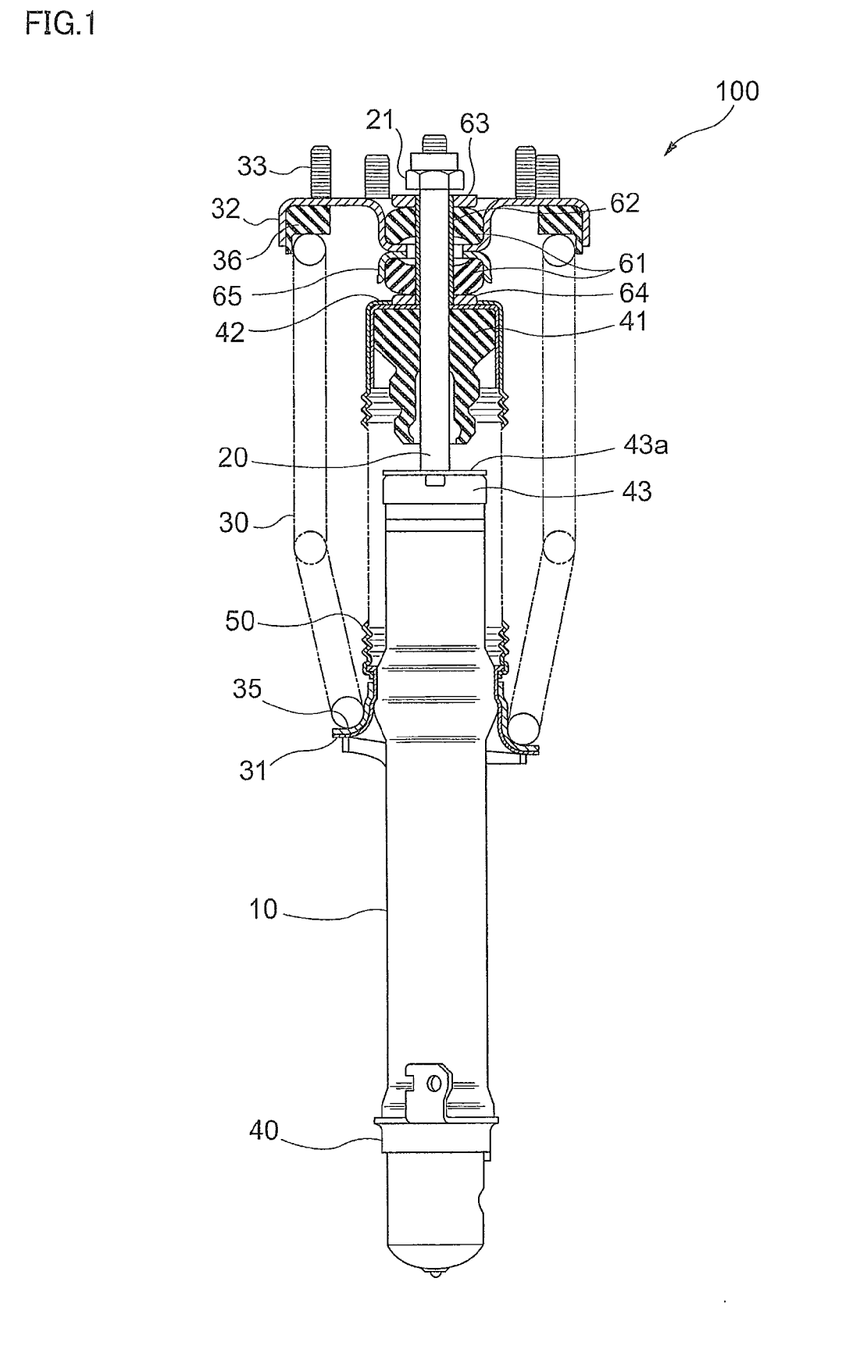
FIG. 1 is a diagram for illustrating a schematic configuration of a suspension according to this exemplary embodiment.

FIG. 1 is a diagram for illustrating a schematic configuration of a suspension 100 according to these exemplary embodiments.

As shown in FIG. 1, the suspension 100 includes: a cylinder 10 into which a damping device (not shown) is incorporated; a piston rod 20 that supports a piston (not shown) contained in the cylinder 10; and a spring 30 that is arranged on the outer side of the piston rod 20. The piston rod 20 is a cylindrical member, the piston is attached thereto at one end side in a direction along the centerline of the cylinder, and a nut 21 is attached thereto at the other end side in the direction along the centerline. Hereinafter, the direction along the centerline of the cylinder of the piston rod 20 may be simply referred to as a "centerline direction" in some cases.

The suspension 100 includes: a lower spring sheet 31 that is attached to the outer circumference of the cylinder 10 and supports the lower end part of the spring 30; and an upper spring sheet 32 that is attached to the outer circumference of the piston rod 20 at the other end side in the centerline direction and supports the upper end part of the spring 30. A lower sheet rubber 35 is interposed between the lower end part of the spring 30 and the lower spring sheet 31, and an upper sheet rubber 36 is interposed between the upper end part of the spring 30 and the upper spring sheet 32.

The suspension 100 includes a wheel-side attachment 40 provided at the lower side of the cylinder 10. A bolt 33 for attaching the suspension 100 to a vehicle is attached to the upper spring sheet 32.

Further, the suspension 100 includes: a bump rubber 41 that is pressed onto the outer circumference of the piston rod 20 protruding from the cylinder 10; and a bump rubber cup 42 that is arranged on the outer circumference of the bump rubber 41. Furthermore, the suspension 100 includes a bump stopper cap 43 that is mounted on a sliding part of the cylinder 10 sliding on the piston rod 20. A cap plate 43a into which the bump rubber 41 bumps at the most compressed state of the suspension 100 is attached to the bump stopper cap 43.

The suspension 100 includes a dust cover 50 whose upper end part is mounted on the outer circumference of the bump rubber cup 42 and whose lower end part is mounted on the lower spring sheet 31. The dust cover 50 serves as a cover member for covering the outer circumferences of the cylinder 10 and the piston rod 20 located between these end parts. The lower end part of the dust cover 50 is fastened to the lower spring sheet 31 with, for example, a clamping ring (not shown) and a screw.

Further, the suspension 100 includes: multiple mount rubbers 61 (two mount rubbers in these exemplary embodiments) that are arranged on the upper end side of the piston rod 20 in the vertical direction; a cylindrical mount collar 62 arranged on the inner side of the multiple mount rubbers 61; and an upper metallic washer 63 and a lower metallic washer 64 that sandwich the multiple mount rubbers 61 from the upper and lower sides. The upper mount rubber 61 included in the multiple mount rubbers 61 is inserted into a concavity of the upper spring sheet 32 which is formed by sagging downward from the upper end thereof. The upper end and outer circumference of the lower mount rubber 61 are covered with a mount rubber cup 65 arranged below the upper spring sheet 32.

Figure 2A:
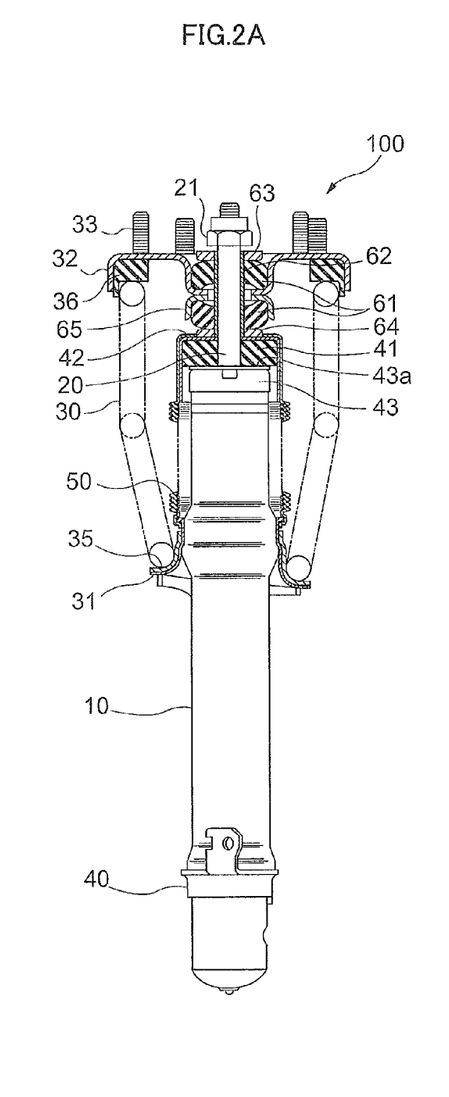
FIG. 2A is a diagram for illustrating a shrunk state in which the length of the piston rod protruding from the cylinder is the shortest.
Figure 2B:
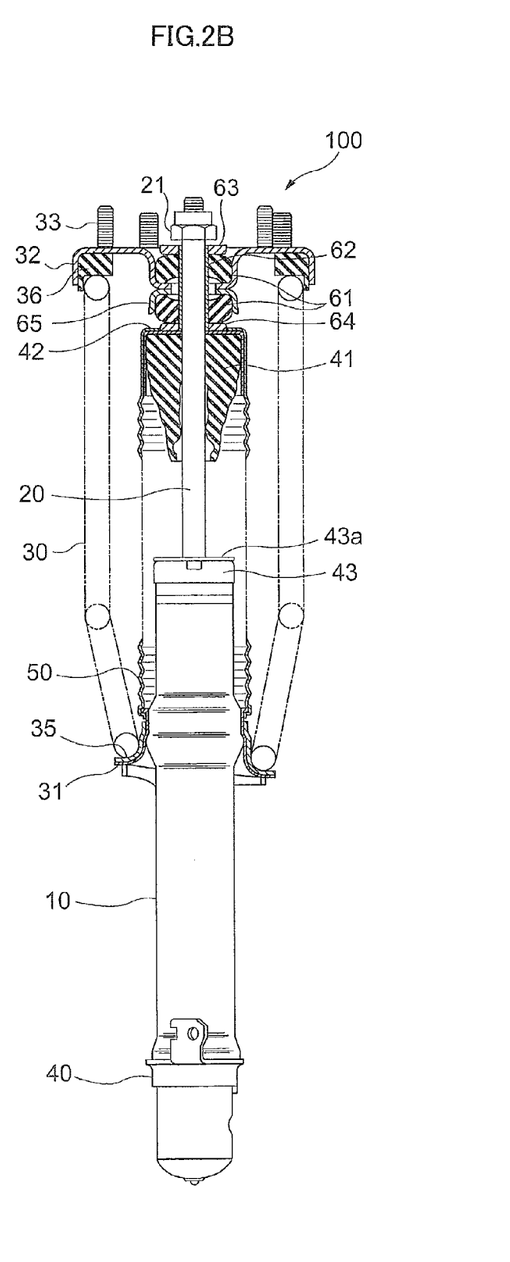
FIG. 2B is a diagram for illustrating a stretched state in which the length of the piston rod protruding from the cylinder is the longest.

FIG. 2A is a diagram for illustrating a shrunk state in which the length of the piston rod 20 protruding from the cylinder 10 is the shortest. FIG. 2B is a diagram for illustrating a stretched state in which the length of the piston rod 20 protruding from the cylinder 10 is the longest.

The suspension 100 having the above-mentioned structure changes to the shrunk state shown in FIG. 2A or the stretched state shown in FIG. 2B, and shock from a road surface is absorbed with the spring 30 or stretching and shrinking vibration of the spring 30 is suppressed in the damping device incorporated into the cylinder 10. This configuration achieves a function as a shock absorber for avoiding transmitting concavities and convexities of the road surface to the vehicle and a function for pressing the vehicle toward the road surface. Therefore, ride quality of the vehicle and operation stability are improved.

Next, the dust cover 50 is described in detail below.

Figure 3A:
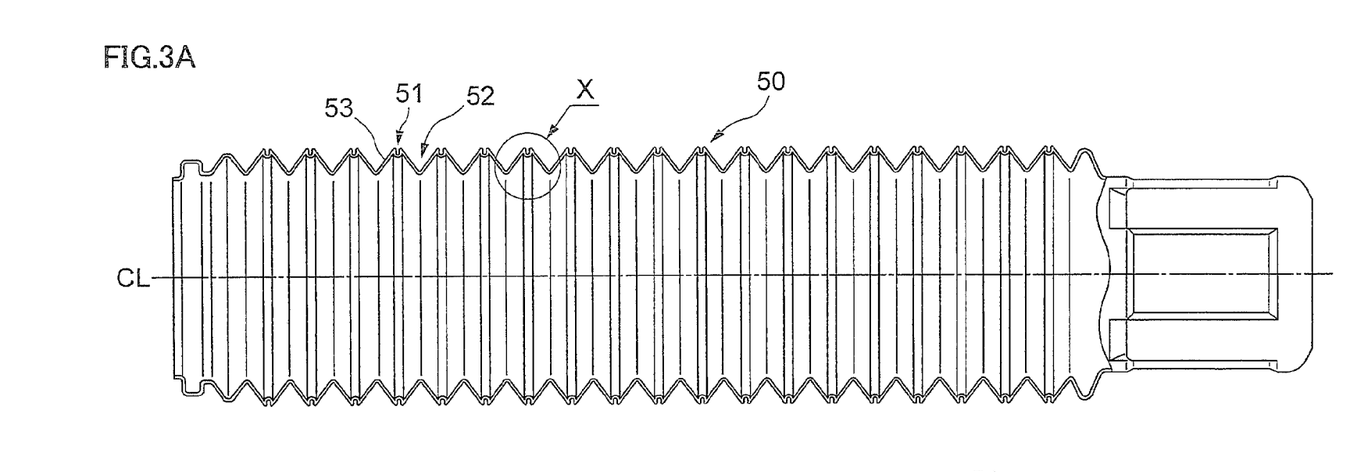
FIG. 3A is a diagram for illustrating a schematic configuration of the dust cover.
Figure 3B:
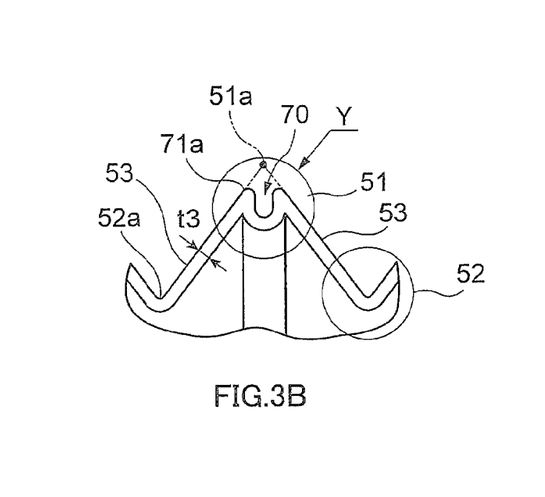
FIG. 3B is an enlarged view of an X portion of FIG. 3A.
Figure 3C:
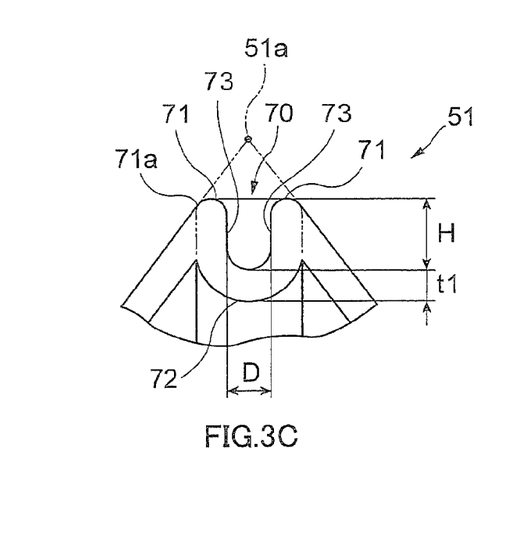
FIG. 3C is an enlarged view of a Y portion of FIG. 3B.

FIG. 3A is a diagram for illustrating a schematic configuration of the dust cover 50. FIG. 3B is an enlarged view of an X portion of FIG. 3A. FIG. 3C is an enlarged view of a Y portion of FIG. 3B.

The dust cover 50 is a bellows member, and the upper end part thereof covers the outer circumference of the bump rubber cup 42 as shown in FIGS. 1 to 2B, while the lower end part thereof is mounted on the lower spring sheet 31. The dust cover 50 is arranged between the spring 30 and the cylinder 10 and between the spring 30 and the piston rod 20, and covers the outer circumferences of the cylinder 10 and the piston rod 20.

The dust cover 50 has multiple peak portions 51 and multiple trough portions 52 which are alternately arranged in a centerline CL direction, and connecting portions 53 that connects the peak portions 51 and the trough portions 52. FIGS. 3A to 3C show cross sections when the multiple peak portions 51 and the multiple trough portions 52 are cut at a plane including the centerline CL. However, the peak portions 51 and the trough portions 52 have this cross section in the whole circumference. The dust cover 50 is freely stretched and shrunk in an array direction of the multiple peak portions 51 and an array direction of the multiple trough portions 52 (the centerline CL direction). In addition, the dust cover 50 is freely bent in a direction perpendicular to the centerline CL. In the state where the dust cover 50 is mounted on the suspension 100, the centerline CL of the dust cover 50 is arranged so as to be overlapped with the centerline of the cylinder of the piston rod 20. Thus, the multiple peak portions 51 and trough portions 52 of the dust cover 50 are arrayed in the centerline direction of the cylinder of the piston rod 20, and the dust cover 50 is stretched and shrunk in this centerline direction (refer to FIGS. 2A and 2B).

In the dust cover 50 according to this exemplary embodiment, hollow parts 70 are formed in the peak portions 51 so as to spread in the whole circumference in the circumferential direction. Here, the hollow parts 70 are hollowed to the inner side (the centerline CL side) from peaks 51a (areas where the adjacent connecting portions 53 intersect with each other when they are elongated) of the peak portions 51.

As shown in FIGS. 3B and 3C, the hollow part 70 has a horse-shoe shaped cross section when it is cut at a plane parallel to the centerline CL, and the hollow part 70 is provided with: edge parts 71 that are end parts of two sides of the horse-shoe shape; a bottom part 72 of the horse-shoe shape; and side parts 73 each provided between corresponding one of the edge parts 71 and the bottom part 72. In FIG. 3B, an arc 71a forming the outer shape of the edge part 71 of the hollow part 70 and an arc 52a forming the outer shape of the trough portion 52 are connected with a straight line. In other words, the edge part 71 of the hollow part 70 and the trough portion 52 are connected with a straight line. According to another point of view, the connecting portion 53 supports the edge part 71 of the hollow part 70, and the bottom part 72 and the side part 73 of the hollow part 70 are supported by the edge part 71.

The height of the horse-shoe shaped hollow part 70 from the edge to the bottom of the horse-shoe shape, that is, the height H from the end of the edge part 71 to the arc of the bottom of the bottom part 72 (refer to FIG. 3C) is set larger than the width of the horse-shoe shape of the hollow part 70, that is the distance D between the side parts 73 in the centerline CL direction.

A material of the dust cover 50 includes, for example: rubber, an elastically deformable synthetic resin such as a synthetic resin formed of a polypropylene (PP) and ethylene-propylene-diene rubber (EPDM). A method for forming the dust cover 50 includes, for example: a blow forming method, and an injection forming method.

Figure 4:
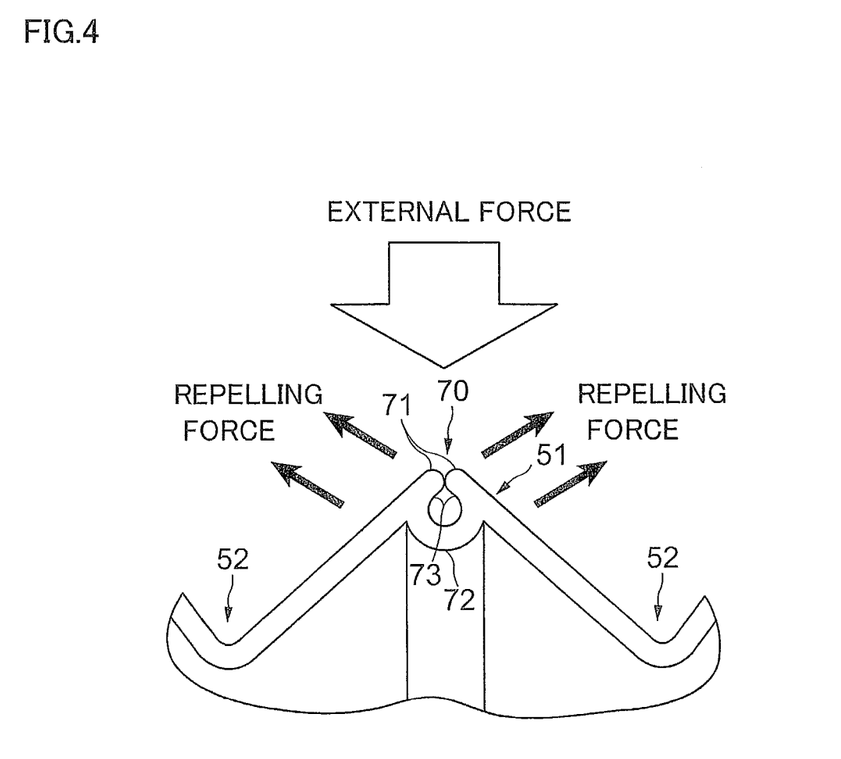
FIG. 4 is a diagram for illustrating a function of the dust cover according to this exemplary embodiment.

FIG. 4 is a diagram for illustrating a function of the dust cover 50 according to this exemplary embodiment.

In the dust cover 50 having the above-described configuration according to this exemplary embodiment, as shown in FIG. 4, when the peak portion 51 is nearly dented to the inner side (centerline CL side) by force from the outside, the two edge parts 71 of the hollow part 70 of the peak portion 51 are brought into contact with each other, and, as a result, the two edge parts 71 repel each other and attempt to return to the original shape. The edge parts 71 are brought into contact with each other before the two side parts 73 of the hollow part 70 are brought into contact with each other, and the edge parts 71 repel to each other and attempt to return to the original shape.

It is considered that this action is caused by the mechanism described below.

Figure 5A:
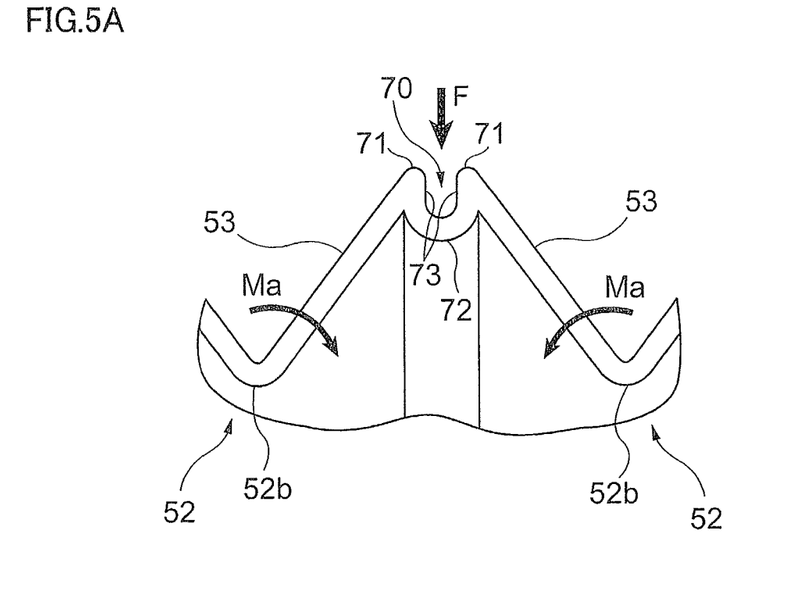
FIGS. 5A and 5B are diagrams for illustrating force acting on the dust cover when the dust cover is subjected to external force in a direction toward the centerline from the outside.
Figure 5B:
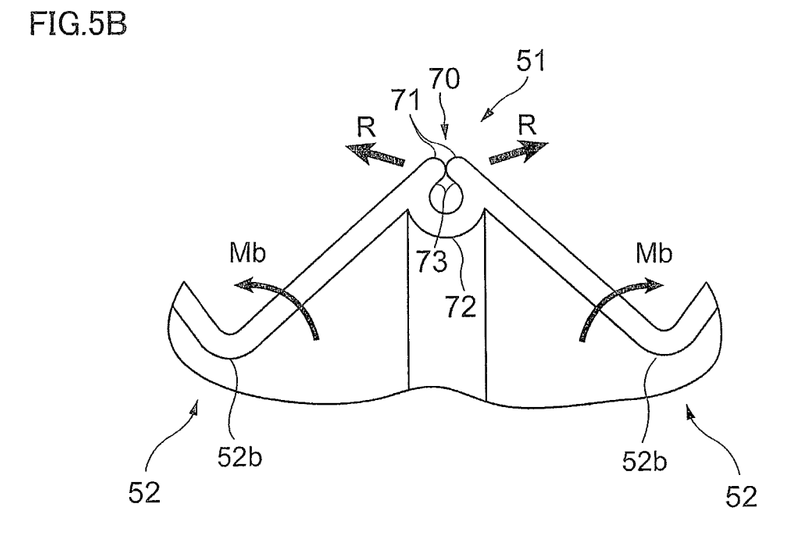

FIGS. 5A and 5B are diagrams for illustrating force acting on the dust cover 50 when the dust cover 50 is subjected to external force in a direction toward the centerline CL from the outside. FIG. 5A is a diagram for illustrating force acting on the dust cover 50 when the peak portion 51 is subjected to external force. FIG. 5B is a diagram for illustrating force acting thereon when the dust cover 50 is deformed by the external force and the edge parts 71 of the hollow part 70 of the peak portion 51 are brought into contact with each other.

When the peak portion 51 of the dust cover 50 is subjected to external force F in a direction toward the centerline CL, as shown in FIG. 5A, bending moment Ma is generated on the trough portions 52 of the dust cover 50, which are adjacent to the peak portion 51 subjected to the external force. Here, the bending moment Ma has a pivot point at the bottom 52b of the trough portion 52, and causes the peak portion 51 to sink down to the inner side. As a result, the peak portion 51 subjected to the external force F (multiple peak portions 51 in a case where the multiple peak portions 51 are subjected to the external force F) and connecting portions 53 that connect the peak portion 51 (multiple peak portions 51) and the trough portions 52 adjacent thereto rotate in a direction for making the peak portion 51 subjected to the external force F move to the inner side (direction for making the angles of the troughs of the trough portions 52 larger). Since the edge parts 71 of the hollow part 70 of the peak portion 51 are supported by the connecting portions 53 respectively, each of the edge parts 71 also rotates by the rotation of the connecting portions 53. Here, the height H from the end of the edge parts 71 of the hollow part 70 to the arc of the bottom of the bottom part 72 is set larger than the distance D between the side parts 73. Thus, the edge parts 71 are brought into contact with each other.

When the edge parts 71 of the hollow part 70 of the peak portion 51 are brought into contact with each other, repelling force R is generated at each of the edge parts 71, as shown in FIG. 5B. By the repelling force R generated at each of the edge parts 71, it is considered that bending moment Mb is generated on the trough portions 52 and the connecting portions 53 which are adjacent to the peak portion 51. Here, the bending moment Mb has a pivot point at the arc 52a of the trough portion 52. As a result, the peak portion 51 subjected to the external force F and the connecting portions 53 connecting the peak portion 51 and the adjacent trough portions 52 rotate in a direction for making the peak portion 51 subjected to the external force F return to the original shape (direction for making the angles of the troughs of the trough portions 52 smaller). By this rotation, the dust cover 50 returns to the original shape.

As described above, even if the dust cover 50 according to this exemplary embodiment is deformed by external force, the dust cover 50 is subjected to force for making the dust cover 50 return to the original shape by itself, and thus the peak portion 51 is difficult to be hollowed. Therefore, if an operator applies force to this peak portion 51 by mistake when the suspension 100 on which the dust cover 50 is mounted is incorporated into a vehicle, or if a stone or the like hits the vehicle on which the suspension 100 is mounted while the vehicle is moving, the peak portion 51 is difficult to be dent. As a result, the dust cover 50 is difficult to be damaged, such as a tear.

In addition, in the dust cover 50 according to this exemplary embodiment, since the edge parts 71 of the hollow part 70 of the peak portion 51 are brought into contact with each other and repel each other, so-called bowing which is caused by uneven shrinkage of the whole circumference is less likely to occur when the dust cover 50 is shrunk. Thus, contact between the dust cover 50 and the spring 30 may be suppressed.

Figure 6A:
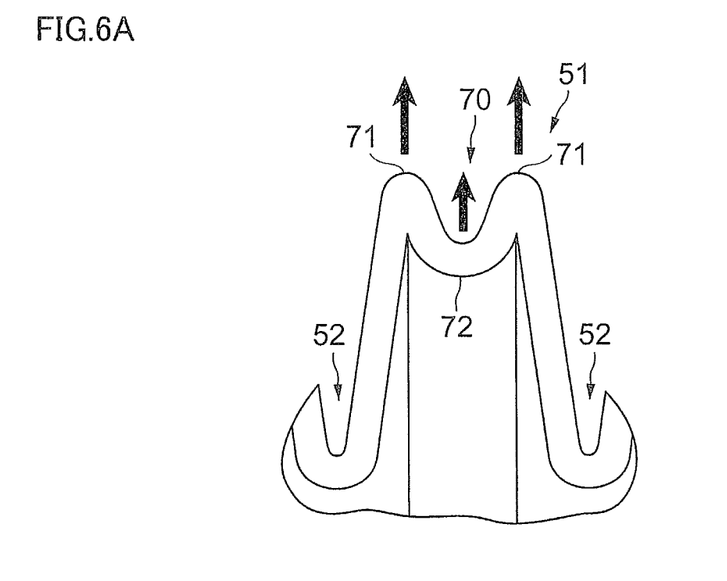
FIG. 6A is a diagram for illustrating force acting on the dust cover according to this exemplary embodiment when the dust cover is shrunk.
Figure 6B:
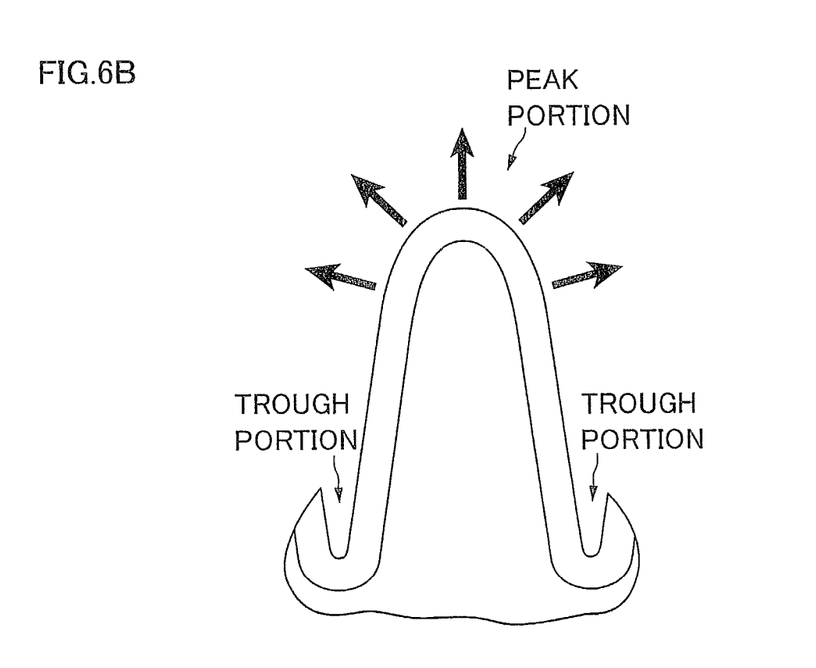
FIG. 6B is a diagram for illustrating force acting on a dust cover according to a comparative example when the dust cover is shrunk.

FIG. 6A is a diagram for illustrating force acting on the dust cover 50 according to this exemplary embodiment when the dust cover 50 is shrunk. FIG. 6B is a diagram for illustrating force acting on a dust cover according to a comparative example when the dust cover is shrunk. The dust cover that does not have the hollow part 70 in the peak portion is shown as the comparative example.

When the dust cover 50 is shrunk, since angles of the troughs of the trough portions 52 become small, the two edge parts 71 and the bottom part 72 of the hollow part 70 of the peak portion 51 are subjected to force in a direction perpendicular to the centerline CL, as shown in FIG. 6A. On the other hand, when the dust cover according to the comparative example which does not have the hollow part 70 in the peak portion is shrunk, a peak of the peak portion is subjected to force in the direction perpendicular to the centerline CL while a periphery of the peak in the peak portion is subjected to force in directions inclined with respect to the direction perpendicular to the centerline CL, as shown in FIG. 6B.

Therefore, the peak portion 51 of the dust cover 50 according to this exemplary embodiment is less likely to be dent than that of the dust cover according to the comparative example even if force acts thereon from the outside when the dust cover is shrunk. Thus, if the suspension 100 on which the dust cover 50 according to this exemplary embodiment is mounted is hit by a stone or the like while moving, the peak portion 51 is less likely to be dent than that in the suspension 100 on which the dust cover according to the comparative example is mounted. As a result, the dust cover 50 according to this exemplary embodiment is less likely to be damaged, such as a tear, than the dust cover according to the comparative example.

Note that, in the aforementioned dust cover 50 according to this exemplary embodiment, the above-mentioned effect is achievable independently from the wall thickness of the peak portions 51. For example, the above-mentioned effect is achievable not only in a case where the bottom part 72 of the peak portion 51 and the side parts 73 have the uniform wall thickness, but also in a case where they have not the uniform (same) wall thickness.

However, it is expected that the wall thickness t1 (refer to FIG. 3C) of the bottom part 72 of the hollow part 70 of the peak portion 51 will be thinner than the thickness of the other sections such as the wall thickness t3 (refer to FIG. 3B) of the connecting portion 53 and the wall thickness of the side parts 73. By this configuration, when the peak portion 51 of the dust cover 50 is subjected to the external force F, the bottom part 72 is easily deformed. As a result, the edge parts 71 are easily brought into contact with each other, and self recovery is achieved more quickly.

Alternatively, it is expected that the wall thickness t1 (refer to FIG. 3C) of the bottom part 72 of the hollow part 70 of the peak portion 51 will be thicker than the other parts such as the wall thickness of the side parts 73. By this configuration, when the peak portion 51 of the dust cover 50 is subjected to the external force F, the bottom part 72 is difficult to be deformed, and thus the peak portion 51 is also difficult to be dent.

Figure 7:
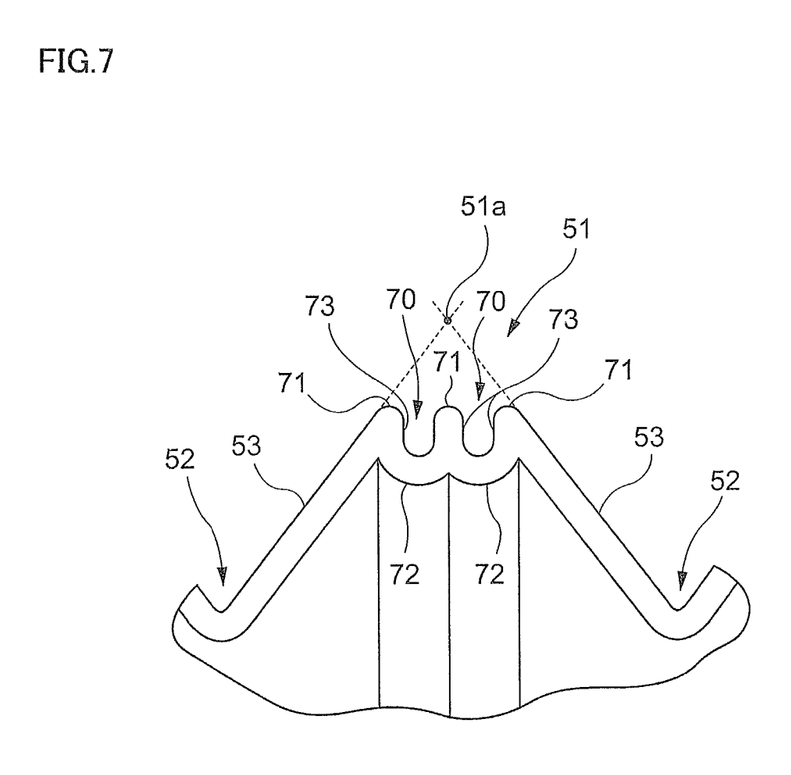
FIG. 7 is a diagram for illustrating shapes of the peak portions and the trough portions of the dust cover according to another exemplary embodiment.

FIG. 7 is a diagram for illustrating shapes of the peak portions 51 and the trough portions 52 of the dust cover 50 according to another exemplary embodiment.

In the peak portion 51 of the dust cover 50, multiple hollow parts 70 which are hollowed from the peak 51a of the peak portion 51 toward the inner side (the centerline CL side) in the circumferential direction may be formed. FIG. 7 shows another exemplary embodiment in which two hollow parts 70 are formed in the peak portion 51. In the dust cover 50 according to another exemplary embodiment shown in FIG. 7, the peak portion 51 has three edge parts 71, two bottom parts 72 and three side parts 73. The edge parts 71 located on the outer side out of the three edge parts 71 are connected to the respective trough portions 52 adjacent to this peak portion 51 through the respective connecting portions 53. Also in the dust cover 50 having the aforementioned configuration, the edge parts 71 connected to the respective connecting portions 53 are brought into contact with the edge part 71 which is located on the inner side and is not connected to the connecting portions 53. Since the edge part 71 that is not connected to the connecting portions 53 is subjected to force from both sides, the two edge parts 71 which are located on the outer side and are connected to the respective connecting portions 53 repel each other through the edge part 71 located on the inner side.

As a result, as described with FIGS. 5A and 5B, it is considered that the bending moment Mb, which has a pivot point at the bottom 52b of the trough portion 52, is generated on the trough portions 52 and the connecting portions 53 adjacent to the peak portion 51 subjected to the external force F by the repelling force R generated on the edge parts 71. Further, the peak portion 51 subjected to the external force F and the connecting portions 53 connecting this peak portion 51 to the adjacent trough portions 52 rotate in a direction for making the peak portion 51 subjected to the external force F return to the original shape (direction for making the angles of the troughs of the trough portions 52 smaller). Thereby, the dust cover 50 returns to the original shape.

Thus, also in the dust cover 50 according to another exemplary embodiment, the peak portion 51 is less likely to be dent even if force acts thereon from the outside and the dust cover 50 is deformed, since the dust cover 50 is subjected to the force for making the dust cover 50 return to the original shape by itself. Therefore, if an operator applies force to this peak portion 51 by mistake when the suspension 100 on which the dust cover 50 is mounted is incorporated into a vehicle, or if a stone or the like hits the vehicle on which the suspension 100 is mounted while the vehicle is moving, the peak portion 51 is difficult to be dent, and the dust cover 50 is difficult to be damaged, such as a tear. In addition, since bowing is less likely to occur when the dust cover 50 is shrunk, contact between the dust cover 50 and the spring 30 is suppressed.

Figure 8A:
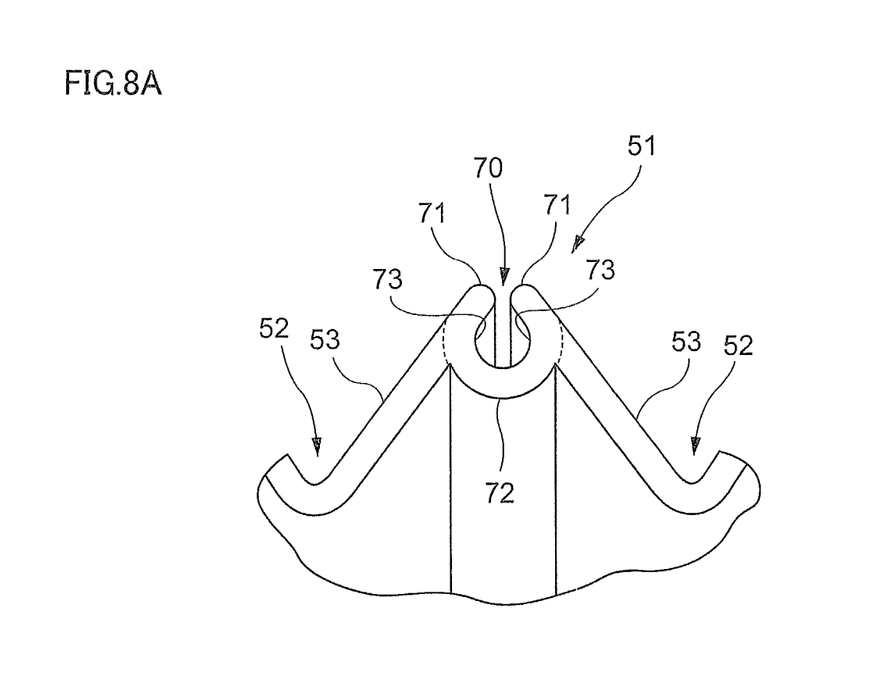
FIGS. 8A and 8B are diagrams for illustrating shapes of the peak portions and the trough portions of the dust cover according to further exemplary embodiment.
Figure 8B:
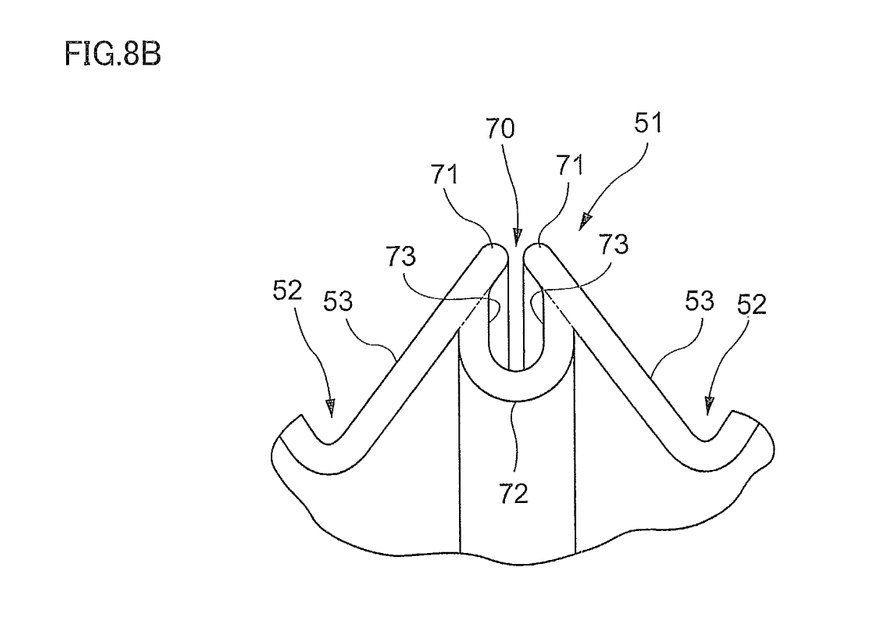

FIGS. 8A and 8B are diagrams for illustrating shapes of the peak portions 51 and the trough portions 52 of the dust cover 50 according to further exemplary embodiment.

The distance between the edge parts 71 of the hollow part 70 of the peak portion 51 in the centerline CL direction may not be larger than the distance between the side parts 73 of the hollow part 70. In the aforementioned exemplary embodiment described with FIGS. 3A to 3C, the distance between the edge parts 71 of the hollow part 70 in the centerline CL direction is the same as the distance between the side parts 73. FIGS. 8A and 8B show examples in which the distance between the edge parts 71 of the hollow part 70 in the centerline CL direction is smaller than the distance between the side parts 73.

In other words, the hollow part 70 provided to the peak portion 51 of the dust cover 50 may have a cross section formed into a circle or an ellipse having an opening on the upper side in a case where the hollow part 70 is cut at the plane parallel to the centerline CL. That is, the hollow part 70 of the peak portion 51 of the dust cover 50 according to further exemplary embodiment shown in FIGS. 8A and 8B is provided with: edge parts 71 located on both sides of the opening on the upper side of the circle (refer to FIG. 8A) or the ellipse (refer to FIG. 8B); a bottom part 72 that is located on a side opposite to the opening of the circle (refer to FIG. 8A) or the ellipse (refer to FIG. 8B); and side parts 73 located between the edge parts 71 and the bottom part 72. The edge parts 71 are connected to the respective trough portions 52 adjacent thereto through the respective connecting portions 53. Also in the dust cover 50 having such a configuration, the edge parts 71 connected to the respective connecting portions 53 are brought into contact with each other and repel each other when force acts thereon from the outside.

As a result, even if force acts thereon from the outside, the connecting portions 53 adjacent to the peak portion 51 subjected to the force rotate in a direction for making the peak portion 51 subjected to the external force return to the original shape (direction for making the angles of the troughs of the trough portions 52 smaller). Thereby, the dust cover 50 returns to the original shape.

Therefore, also in the dust cover 50 according to further exemplary embodiment, the peak portion 51 is less likely to be dent even if force acts thereon from the outside and the dust cover 50 is deformed, since the force for making the dust cover 50 return to the original shape by itself acts thereon. Thus, if an operator applies force to this peak portion 51 by mistake when the suspension 100 on which the dust cover 50 is mounted is incorporated into a vehicle, or if a stone or the like hits the vehicle on which the suspension 100 is mounted while the vehicle is moving, the peak portion 51 is difficult to be dent, and the dust cover 50 is difficult to be damaged, such as a tear. In addition, since bowing is less likely to occur when the dust cover 50 is shrunk, contact between the dust cover 50 and the spring 30 may be suppressed.

Note that, in the aforementioned exemplary embodiments, description has been given for the dust cover 50 of the suspension 100 in which the hollow part 70 is formed in the peak portion 51 of the bellows cover having the continuous peak portions 51 and trough portions 52. However, this configuration is not especially limited to the dust cover 50 of the suspension 100. It may be widely applied to a cover member having bellows.

For example, it may be applied to a boot that is a seal member for sealing grease of a constant-velocity joint mounted on a vehicle as an undercarriage item, keeping dust, water and the like from entering from the outside, and maintaining a lubricating property of the constant-velocity joint. By providing, to the peak portions of the boot, the hollow parts 70 each having the edge parts 71 repelling each other when external force acts thereon, if a stone or the like hits the vehicle on which the boot is mounted while the vehicle is moving, or if an operator applies force to this peak portion 51 by mistake when the boot is incorporated into a vehicle, the peak portion 51 is difficult to be dent, and the boot is difficult to be damaged, such as a tear.

In addition, it may be applied to a duct that is arranged in an engine room of a vehicle. By providing, to the peak portions 51 of the duct having bellows, hollow parts 70 each having the edge parts 71 repelling each other when external force acts thereon, if an operator applies force to this peak portion 51 by mistake when the duct is incorporated into a vehicle, the peak portion 51 is difficult to be dent. As a result, disfigurement caused by a dent at a part of the duct may be suppressed. In addition, air may smoothly pass through the inside of the duct.

Heretofore, description has been given for a cover member having bellows in which the hollow part 70 is formed in the peak portion 51. However, it is not especially limited to the cover member having the bellows. A hollow part 70 may be widely provided to a peak portion in a cover member that has plural peak and trough portions, that is freely stretched and shrunk or bent in an array direction of the peak and trough portions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A cover member having a plurality of peak portions and a plurality of trough portions, and freely stretched and shrunk in an array direction of the plurality of peak portions and the plurality of trough portions or freely bent, the cover member comprising:

a hollow part formed in each of the plurality of peak portions, the hollow part being hollowed toward an inner side from a peak of each of the plurality of peak portions, being formed in a circumferential direction, and having edge parts, a bottom part and side parts located between the edge parts and the bottom part, wherein a height H of the hollow part and a distance D between the side parts is set to be D<H, wherein the edge parts of the hollow part are brought into contact with each other before the side parts of the hollow part are brought into contact with each other, when at least one of the plurality of peak portions is subjected to force in a direction intersecting with the array direction from an outside.

2. The cover member according to claim 1, wherein the edge parts of the hollow part are connected to the plurality of trough portions.

3. A cover member having a plurality of peak portions and a plurality of trough portions, and freely stretched and shrunk in an array direction of the plurality of peak portions and the plurality of trough portions or freely bent, the cover member comprising:

a hollow part formed in each of the plurality of peak portions, the hollow part being hollowed toward an inner side from a peak of each of the plurality of peak portions, being formed in a circumferential direction, and having edge parts, a bottom part and side parts located between the edge parts and the bottom part, wherein a height H of the hollow part and a distance D between the side parts is set to be D<H, wherein distance between the edge parts of the hollow part in the array direction is not larger than distance between the side parts of the hollow part.

4. The cover member according to claim 3, wherein the edge parts of the hollow part are connected to the plurality of trough portions.

5. A suspension comprising:
a cylinder into which a damping device is incorporated;
a piston rod that supports a piston contained in the cylinder;
a spring that is arranged on an outer side of the piston rod; and
a cover member that is arranged between the cylinder and the spring and between the piston rod and the spring, and covers outer circumferences of the cylinder and the piston rod, wherein
the cover member has a plurality of peak portions and a plurality of trough portions, and is freely stretched and shrunk in an array direction of the plurality of peak portions and the plurality of trough portions or freely bent, the cover member comprising:
a hollow part formed in each of the plurality of peak portions, the hollow part being hollowed toward an inner side from a peak of each of the plurality of peak portions, being formed in a circumferential direction, and having edge parts, a bottom part and side parts located between the edge parts and the bottom part, wherein a height H of the hollow part and a distance D between the side parts is set to be D<H, wherein the edge parts of the hollow part are brought into contact with each other before the side parts of the hollow part are brought into contact with each other, when at least one of the plurality of peak portions is subjected to force in a direction intersecting with the array direction from an outside.

6. A suspension comprising:

a cylinder into which a damping device is incorporated;

a piston rod that supports a piston contained in the cylinder;

a spring that is arranged on an outer side of the piston rod; and a cover member that is arranged between the cylinder and the spring and between the piston rod and the spring, and covers outer circumferences of the cylinder and the piston rod, wherein the cover member has a plurality of peak portions and a plurality of trough portions, and is freely stretched and shrunk in an array direction of the plurality of peak portions and the plurality of trough portions or freely bent, the cover member comprising:

a hollow part formed in each of the plurality of peak portions, the hollow part being hollowed toward an inner side from a peak of each of the plurality of peak portions, being formed in a circumferential direction, and having edge parts, a bottom part and side parts located between the edge parts and the bottom part, wherein a height H of the hollow part and a distance D between the side parts is set to be D<H, wherein distance between the edge parts of the hollow part in the array direction is not larger than distance between the side parts of the hollow part.

* * * * *